United States Patent [19]
Takagi et al.

[11] Patent Number: 5,437,355
[45] Date of Patent: Aug. 1, 1995

[54] FRICTION CLUTCH HAVING A BRAKE MECHANISM

[75] Inventors: Masao Takagi; Satoshi Machida, both of Sakai; Akio Hattori, Osaka, all of Japan

[73] Assignee: Kubota Corporation, Osaka, Japan

[21] Appl. No.: 134,426

[22] Filed: Oct. 8, 1993

[30] Foreign Application Priority Data

Apr. 19, 1993 [JP] Japan .................. 5-091020

[51] Int. Cl.⁶ ........................................... F16D 67/02
[52] U.S. Cl. ........................... 192/18 A; 192/12 C; 192/85 AA
[58] Field of Search .............. 192/18 A, 18 R, 12 C, 192/13 R, 15, 85 AA

[56] References Cited

U.S. PATENT DOCUMENTS

| | | |
|---|---|---|
| 3,595,353 | 7/1971 | Beneke . |
| 3,743,070 | 7/1973 | Howard et al. ............. 192/18 A X |
| 3,835,971 | 9/1974 | Spanke et al. ............. 192/18 A |
| 3,915,269 | 10/1975 | Houser . |
| 3,976,174 | 8/1976 | Van Dest . |
| 4,225,029 | 9/1980 | Ushijima ................. 192/12 C |
| 4,751,989 | 6/1988 | Shinokawa et al. . |
| 5,123,508 | 6/1992 | Pedersen ................. 192/18 A |
| 5,190,129 | 3/1993 | Sommer ................... 192/18 A |

FOREIGN PATENT DOCUMENTS

| | | |
|---|---|---|
| 0389957 | 10/1990 | European Pat. Off. . |
| 54-129247 | 6/1979 | Japan . |
| 2053405 | 2/1981 | United Kingdom . |

*Primary Examiner*—Andrea L. Pitts
*Attorney, Agent, or Firm*—Jordan and Hamburg

[57] ABSTRACT

A friction clutch mounted in a transmission case (25) or the like and connected between a drive shaft (14) for receiving engine power and a driven shaft (15) for receiving power from the drive shaft and transmitting the power to a power takeoff shaft (11). The friction clutch includes a first sleeve (17) connected to the drive shaft, a second sleeve (16) connected to the driven shaft, friction disks (18, 19) disposed between the first sleeve and the second sleeve, the friction disks being switchable between a clutch engaging state to enable power transmission between the first sleeve and the second sleeve, and a clutch disengaging state to disable the power transmission, and a clutch piston (20) movable between a first position to place the friction disks in the clutch engaging state, and a second position to place the friction disks in the clutch disengaging state. The friction clutch further includes a brake mechanism (B) for braking rotation of the driven shaft when the friction disks are in the clutch disengaging state. The brake mechanism includes a first braking member (26) operatively connected to the clutch piston, and a second braking member (24) for contacting the first braking member when the clutch piston is moved to the second position. The second braking member is rotatable through a predetermined range with the first braking member.

7 Claims, 8 Drawing Sheets

FRICTION CLUTCH HAVING A BRAKE MECHANISM

BACKGROUND OF THE INVENTION

1. Field of the Invention

The present invention relates to a friction clutch mounted in a transmission case or the like and connected between a drive shaft for receiving engine power and a driven shaft for receiving power from the drive shaft and transmitting the power to a power takeoff shaft, and more particularly to a friction clutch having a brake mechanism for preventing inertial rotation of the driven shaft.

.2 Description of the Related Art

A conventional friction clutch, particularly a hydraulically operable friction clutch, used on a tractor or the like includes a first sleeve connected to a drive shaft, a second sleeve connected to a driven shaft, and a friction disk assembly having a plurality of friction disks mounted between the first sleeve and second sleeve. The friction disk assembly is switchable between a clutching state to enable power transmission between the first sleeve and second sleeve, and a declutching state to disable the power transmission. The friction clutch further includes a clutch piston movable between a first position to place the friction disk assembly in the clutching state, and a second position to place the friction disk assembly in the declutching state.

It is necessary to prohibit inertial rotation occurring in this type of hydraulically operable friction clutch, in order to avoid the inconvenience of an external working implement continuing to rotate by inertia when the hydraulic clutch is disengaged. For this purpose, proposals have been made in U.S. Pat. No. 4,751,989 and European Patent Publication No. 0 389 957 to provide a brake mechanism for the friction clutch. This brake mechanism uses a biasing spring acting in a direction to disengage the clutch, which presses a driven-side member of the clutch against a member fixed to the transmission case, thereby to brake the clutch.

The prior construction for pressing the driven-side member against the fixed member to brake the clutch is capable of checking the inertial rotation noted above. However, the driven side of the clutch is locked against rotation. Normally, this type of clutch is maintained in a disengaged state when the engine is switched off, with the result that the driven side is maintained unrotatable. Where, for example, a change speed gear mechanism is disposed downstream of the hydraulic clutch, a shifting operation may be impossible as long as the brake mechanism is in operation. Further, when an external working implement is connected to the tractor, engaging projections formed at selected intervals circumferentially of a power takeoff shaft (PTO shaft) may be out of phase with engaging recesses formed in a power input shaft of the working implement. The above prior clutch construction encumbers an operation to engage the projections and recesses in such a situation. Moreover, it is impossible to engage the projections and recesses if the working implement connected is the type having a power input section thereof not rotatable relative to the power takeoff shaft (PTO shaft) when the working implement is in contact with the ground.

SUMMARY OF THE INVENTION

The object of the present invention is to provide a friction clutch for allowing a power takeoff shaft (PTO shaft) to rotate through a predetermined range even when a brake is operated to prevent inertial rotation.

The above object is fulfilled, according to the present invention, by a friction clutch comprising a brake mechanism for braking rotation of a driven shaft when friction disks are in a clutching state, the brake mechanism including a first braking member operatively connected to a clutch piston, and a second braking member for contacting the first braking member when the clutch piston is moved to a position to disengage the clutch, the second braking member being rotatable through a predetermined range with the first braking member.

When the driver effects an operation to disengage the above friction clutch, the clutch piston moves toward the declutching position. With this movement of the clutch piston, the first braking member rotating with the clutch piston is pressed against the second braking member, whereby the two braking members are rigidly connected to each other. Since the second braking member is rotatable only through a predetermined range, the driven shaft is stopped rotating by inertia in the direction of driving rotation of the engine. Since the second braking member is allowed to rotate through the predetermined range, the power takeoff shaft may be rotated a predetermined angle when the brake mechanism is in operation. This allows an external working implement to be connected to the power takeoff shaft with ease.

Thus, inertial rotation of the driven shaft and external working implement may be stopped reliably when the hydraulically operable friction clutch is disengaged. The working implement may be connected to the power takeoff shaft smoothly when the brake mechanism is in operation.

Other features and advantages of the invention will be apparent from the description of a preferred embodiment as illustrated in the accompanying drawings.

DESCRIPTION OF THE PREFERRED EMBODIMENT

An embodiment of the present invention will be described hereinafter with reference to the drawings.

Figure 1:
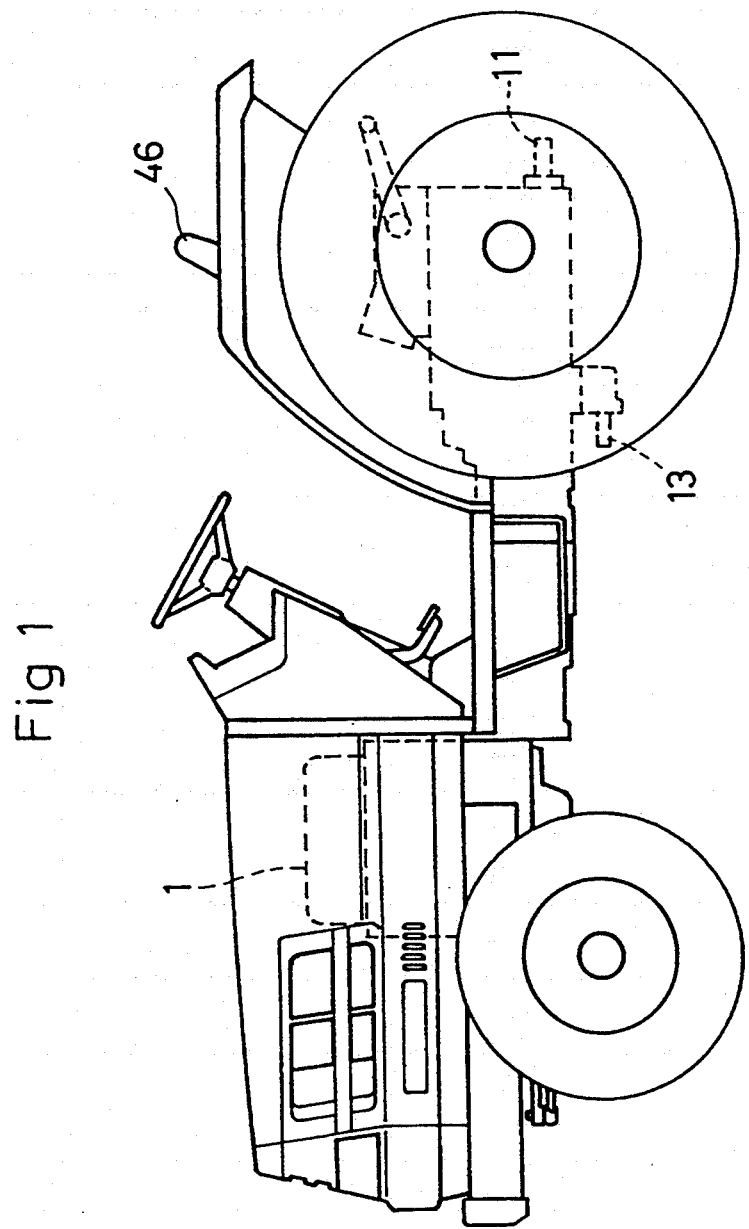
FIG. 1 is a side elevation of an agricultural tractor.
Figure 2:
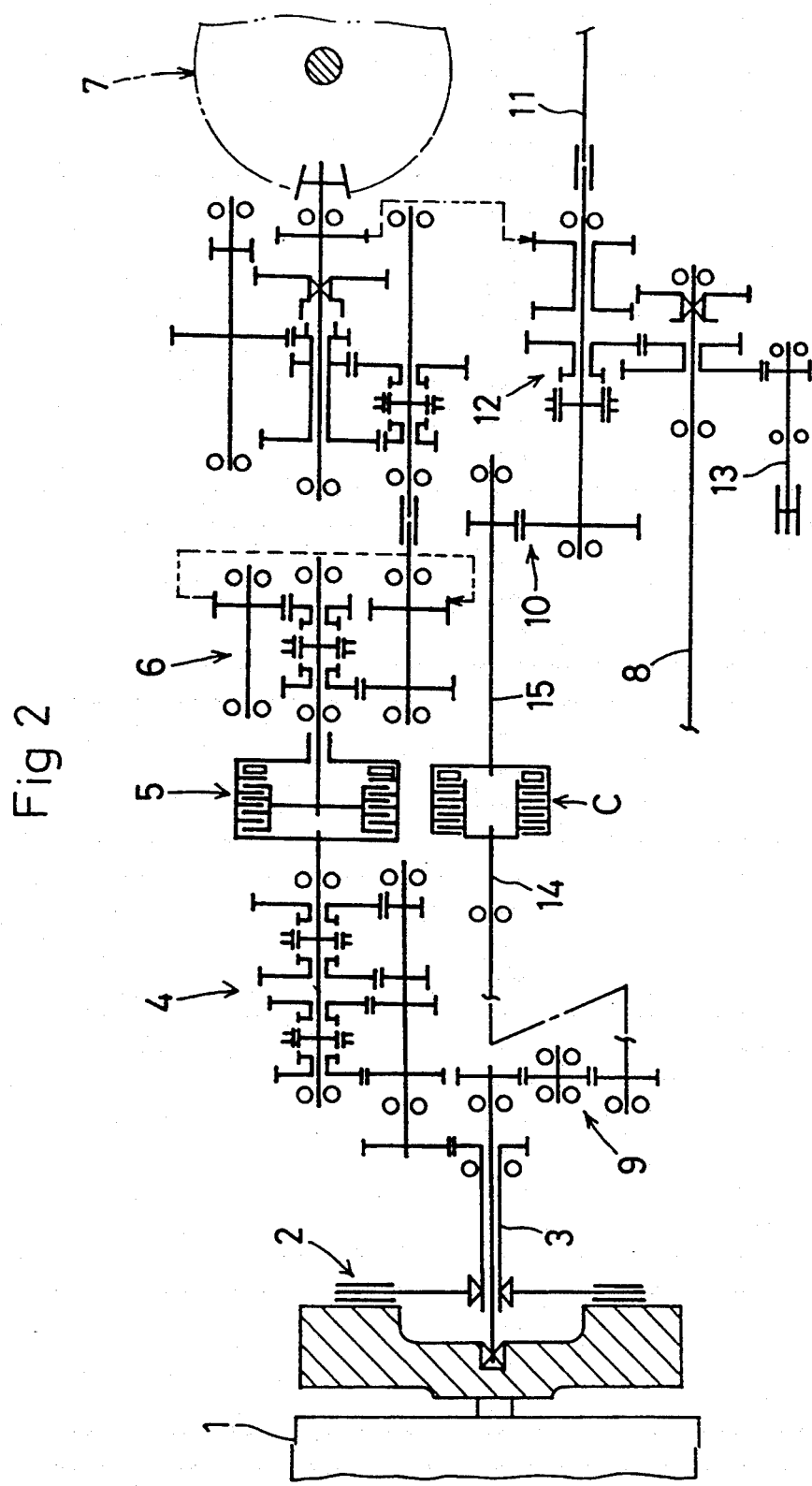
FIG. 2 is a schematic view of a transmission system.

FIG. 1 shows a side elevation of an agricultural tractor, and FIG. 2 a transmission system thereof. The transmission system includes a propelling system and a power takeout system. The propelling system transmits power of an engine 1 through a main clutch 2 and a tubular shaft 3 to a main change speed mechanism 4. Then, the power is transmitted through a hydraulically operable clutch 5 for allowing shifting operations, and through an auxiliary change speed mechanism 6 to a rear differential 7, and also through a transmission shaft 8 to a front differential (not shown). The power takeout system transmits the power of engine 1 through a first reduction gear mechanism 9, a multidisk friction type hydraulic clutch C and a second reduction gear mechanism 10 to a rear power takeoff shaft 11, and selectively through a switch mechanism 12 to a middle power takeoff shaft 13.

The multidisk friction type hydraulic clutch C and a control structure therefor will be described next.

The hydraulic clutch C is mounted between a drive shaft 14 for receiving the power of engine 1 and a power takeoff driven shaft 15 disposed coaxially with and rotatable relative to the drive shaft 14. The hydraulic clutch C includes a second sleeve 16 having a double tube structure and splined to the driven shaft 15 to be rotatable therewith. The second sleeve 16 includes an inner tube 16a and an outer tube 16b defining a tubular space therebetween. This space accommodates a first sleeve 17 attached to an end of the drive shaft 14 to be rotatable therewith. Driving friction disks 18 and driven friction disks 19 are arranged alternately between the first sleeve 17 and the outer tube 16a. The driving disks 18 are interlocked to the first sleeve 17 while the driven disks 19 are interlocked to the outer tube 16a. A hydraulic piston 20 is axially slidably mounted in a deep inward region of the tubular space. The piston 20 is biased to an inward declutching position by a coil spring 21 mounted between the first sleeve 17 and the inner tube 16a. A hydraulic valve V is operable to supply pressure oil for actuating the piston 20 against the biasing force of coil spring 21. With the pressure oil supplied, the piston 20 pushes the friction disks 18 and 19 to engage the clutch C. The end of coil spring 21 remote from the piston 20 is supported by a washer 23 fixed in position by a retaining ring 22. The coil spring 21 mounted inside in this way facilitates an assembling operation. A bearing 56 is mounted on a free end of the driven inner tube 16a. This bearing 56 supports the driving first sleeve 17.

Figure 4:
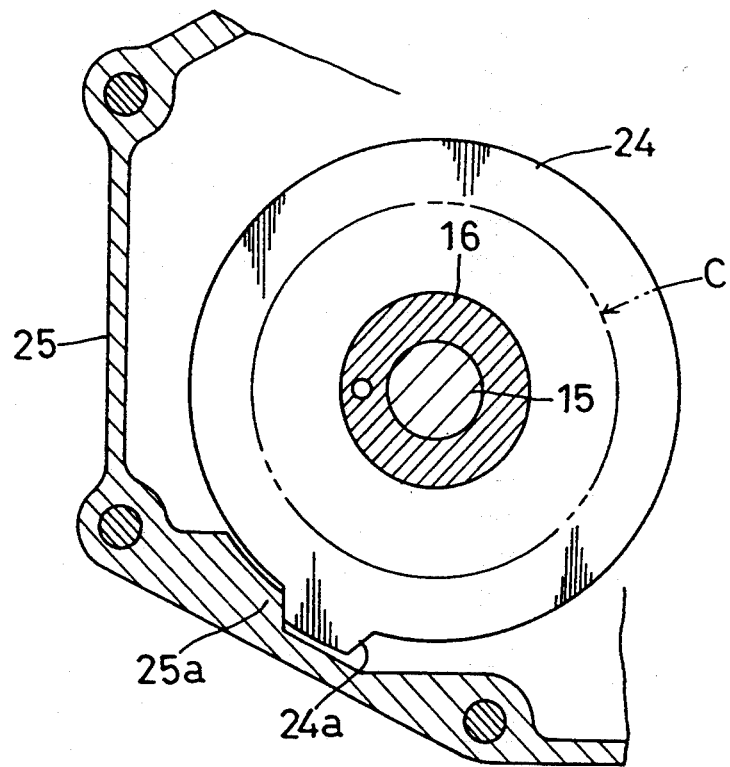
FIG. 4 is a front view of a second braking member.

When the hydraulic piston 20 is pushed back to the declutching position by the coil spring 21, a first braking member 26 in the form of an annular plate and rotatable with the piston 20 is moved by the declutching biasing force into pressure contact with a second braking member 24 to apply a braking force. This structure provides a brake mechanism B for preventing inertial rotation. The second braking member 24 defines an engaging projection 24a for contacting a stationary portion 25a of a transmission case 25 to prevent inertial rotation in a direction corresponding to a direction of driving rotation of the engine 1, and to allow rotation through a predetermined angular range less than 360 degrees in the opposite direction. Specifically, the second braking member 24 in the form of an annular plate is relatively rotatably mounted on the second sleeve 16. The first braking member 26 is arranged axially next to the second braking member 24, also on the second sleeve 16. The first braking member 26 has pins 27 screwed tight thereto and extending axially of the driven shaft 15 through the second sleeve 16 to be slidable relative to the latter. One end of each pin 27 is driven fast into the hydraulic piston 20. Thus, the first braking member 26 is rotatable with the second sleeve 16, and axially slidable with the piston 20. When the clutch C is disengaged, the coil spring 21 forces the first braking member 26 and second braking member 24 into pressure contact with each other to act as a brake. As shown in FIG. 4, the engaging projection 24a has a small circumferential length and, with rotation of the second braking member 24 in the driving direction of the engine 1, contacts the stationary portion 25a formed on an inner wall of the transmission case 25, to prevent further rotation of the second braking member 24. This braking member 24 is manually rotatable about 340 degrees in the direction opposite to the driving direction when the clutch C is disengaged. The second reduction gear mechanism 10 provides a 12/30 reduction ratio, whereby the rear power takeoff shaft 11 is rotatable about 136 degrees. This feature enables an external working implement to be connected to the power takeoff shaft 11 with ease.

Details of the hydraulic valve V will be described next.

Figure 3:
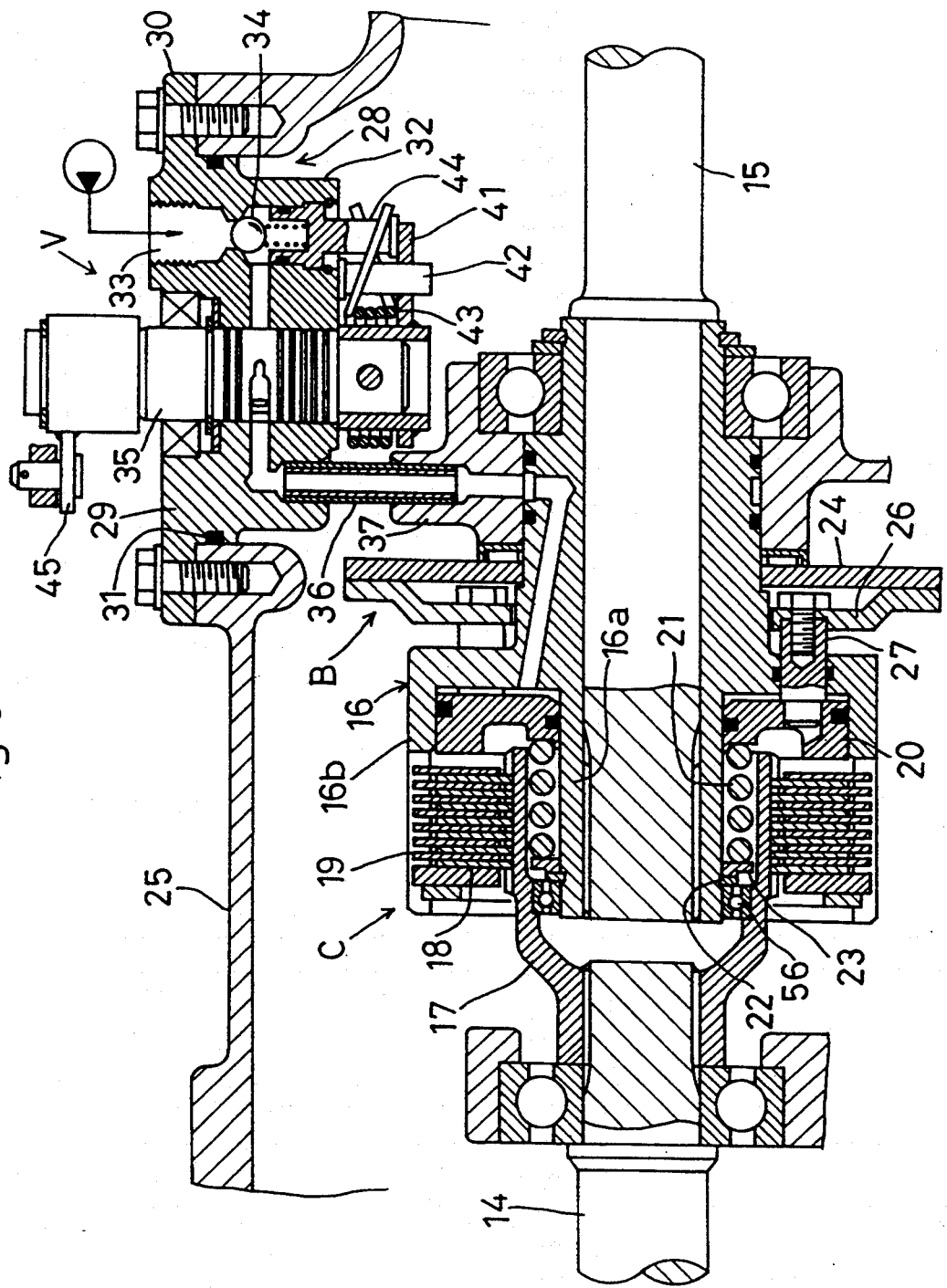
FIG. 3 is a sectional plan view of a hydraulic clutch and associated components.
Figure 5:
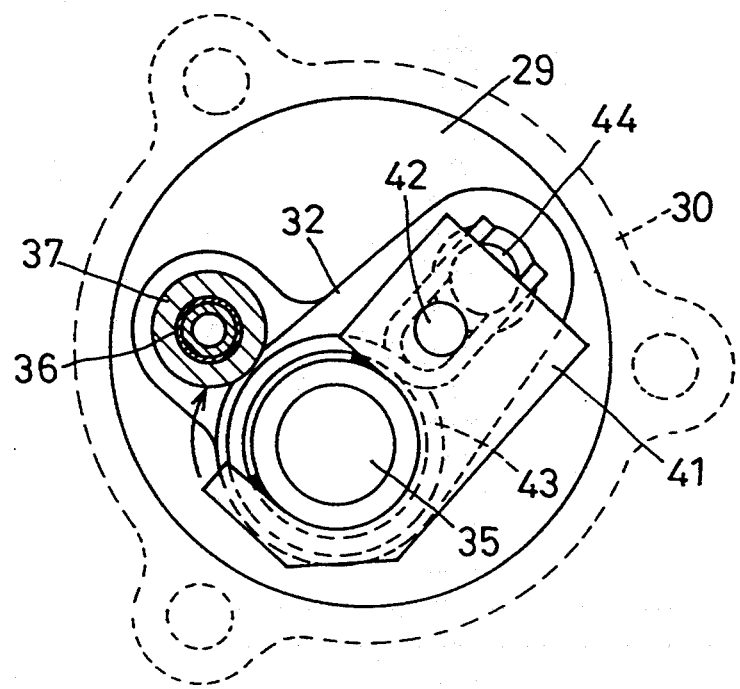
FIG. 5 is a side view of a hydraulic valve.

As shown in FIGS. 3 and 5, the hydraulic valve V has a valve body 29 fitted in a bore 28 formed in a lateral wall of the transmission case 25, with thin flanges 30 of the valve V bolted to three mounts formed on an outer surface of the lateral wall. A slight space is formed between an inner surface of the bore 28 and the valve body 29, which is filled with an elastic seal 31. The valve body 29 includes an oil line switching section 32 lying inwardly of the outer surface of the transmission case 25. With this construction, the thin flanges 30, when bolted tight to the three mounts, absorb any inner distortion due to dimensional errors or the like, and the elastic seal 31 absorbs any distortion of the transmission case 25, whereby the oil line switching section 32 is protected from such inner distortion.

Figure 8:
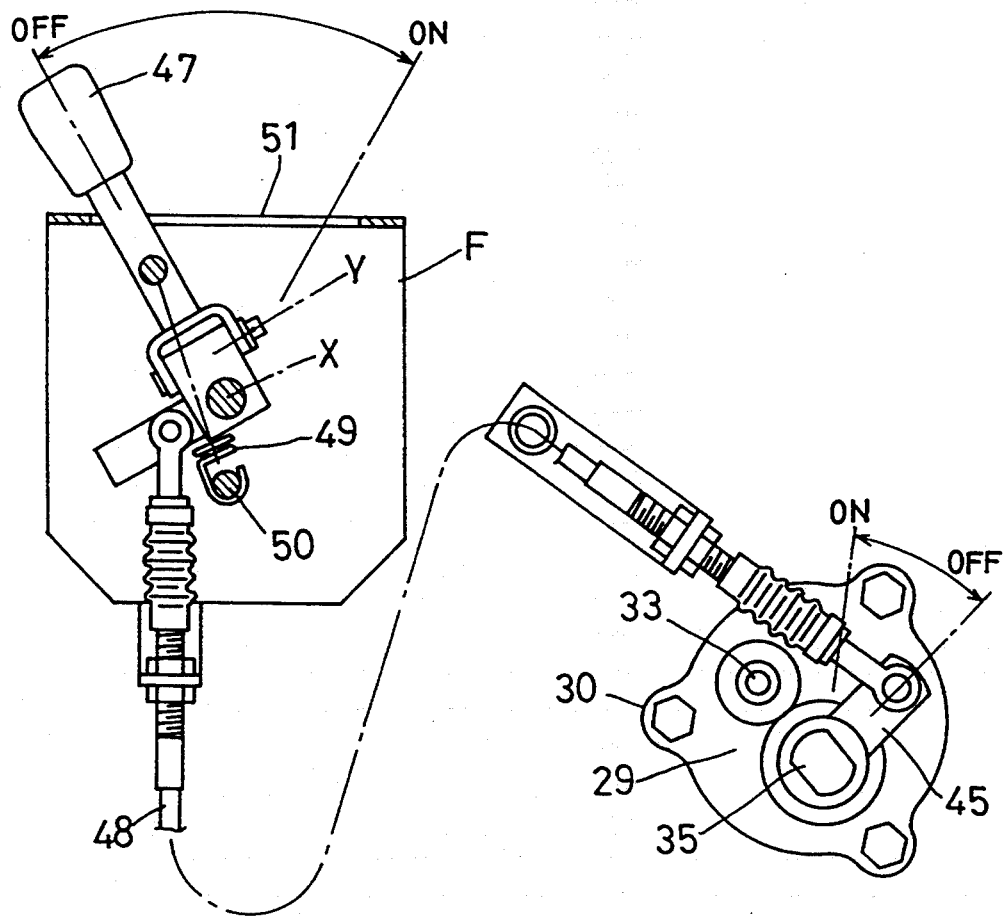
FIG. 8 is a view showing an interlocking structure.

The valve body 29 defines an inlet port 33 for receiving pressure oil. The pressure oil is supplied to the hydraulic clutch C by flowing along oil lines extending from a check valve 34 through a rotary spool 35 acting as an oil line switching member, a connecting pipe 36, a bearing holder 37 and the second sleeve 16. As also shown in FIG. 5, the valve body 29 includes a thick bulk portion in which the spool 35 and check valve 34 are mounted and the connecting pipe 37 is press fit. As shown in FIG. 6a–16c, a pressure oil line L1 extending from the check valve 34 to the spool 35 is substantially perpendicular to a clutch oil line L2 extending from the spool 35 to the connecting tube 36. These oil lines, L1 and L2, lie in the same plane extending radially of the spool 35. The oil lines L1 and L2 may be formed easily by drilling the thick bulk portion from opposite directions toward a spool axis to penetrate a spool receiving bore. Thus, a tank port T communicating with the interior of the transmission case 25 of FIG. 8 is defined in an opposite position from the clutch oil line L2 across the spool 35. The connecting pipe 36 includes a metal pipe with a rubber tube fitted thereon, and is press fit into the valve body 29 and bearing holder 37.

Figure 6A:
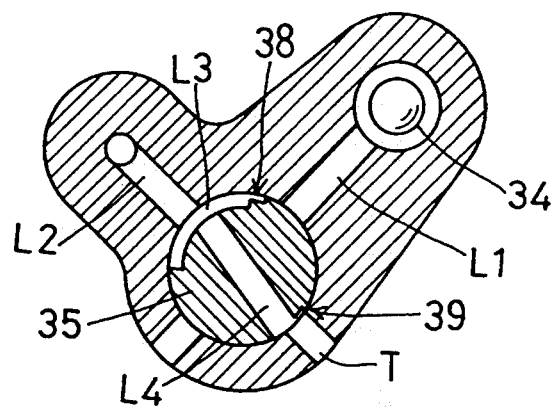
FIGS. 6a, 6b and 6c are explanatory views of operation of the hydraulic valve.
Figure 6B:
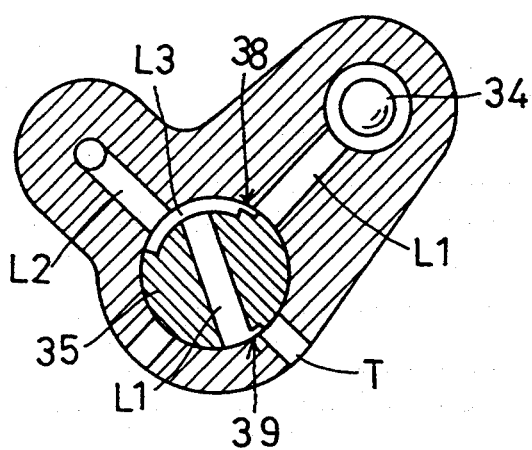
Figure 6C:
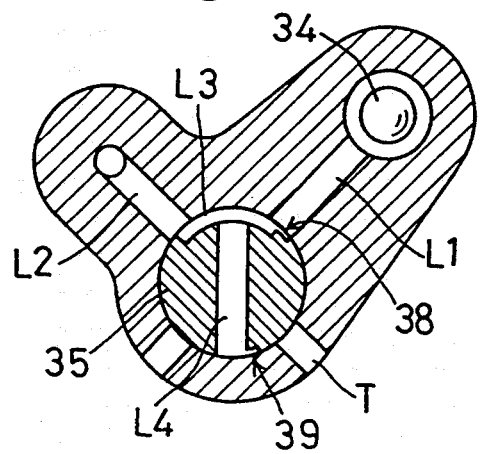
Figure 7:
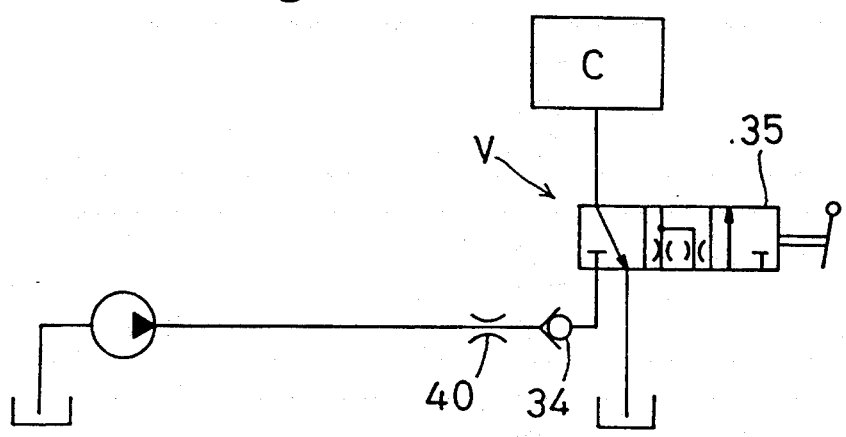
FIG. 7 is a schematic view of a hydraulic circuit.

As shown in FIGS. 6a, 6b and 6c, the valve spool 35 defines a circumferential oil line L3 extending substantially through 90 degrees to connect the oil lines L1 and L2 to engage the clutch C, and a diametric oil line L4 extending diametrically from an intermediate position of the circumferential oil line L3. As shown in FIGS. 6a, 6b and 6c and FIG. 7, the oil line L1 is connected to the tank port T when the clutch C is disengaged, and to the clutch oil line L2 when the clutch C is engaged. The oil lines L3 and L4 include constricted portions 38 and 39, respectively. Thus, during a line switching operation, the clutch oil line L2 communicates with the oil line L1 or tank port T through the constricted portion 38 or 39 to produce a half-clutch condition. A fixed throttle 40 is disposed upstream of the check valve 34 to limit an amount of oil supplied.

A plate 41 is attached to an end of the spool 35 disposed inside the transmission case 25, to be rotatable with the spool 35. The plate 41 has an engaging pin 42, and a helical spring 43 embraces the engaging pin 42 and a fixed pin 44 formed on the valve body 29, to bias the plate 41 and spool 35 to a declutching position. When the spool 35 is rotated to a clutch engaging position, an end of the plate 41 contacts the bearing holder 37 to effect position setting.

A valve control structure will be described next.

Figure 9:
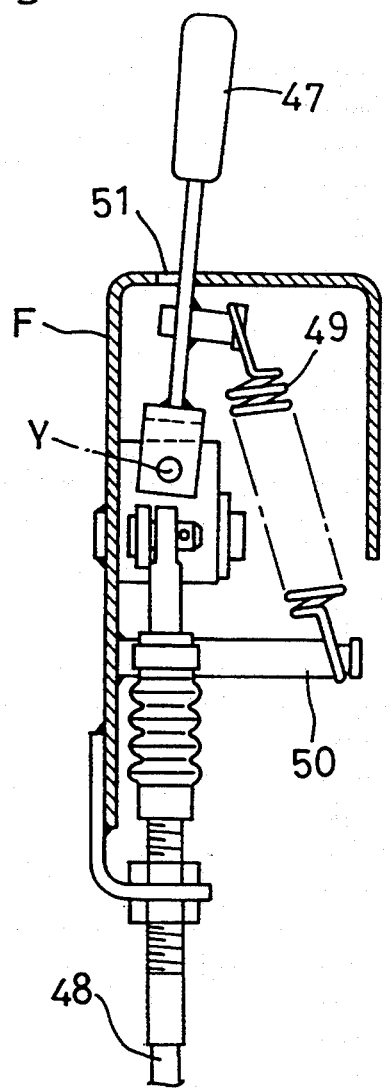
FIG. 9 is a front view of a control lever.
Figure 10:
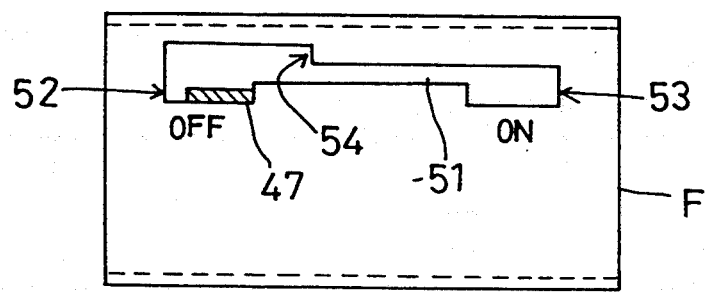
FIG. 10 is a plan view of a lever guide.

The spool 35 has a control arm 45 attached to an end thereof projecting from the transmission case 25. The control arm 45 is interlocked through a control cable 48 to a control lever 47 disposed laterally of a driver's seat 46. As shown in FIGS. 8 and 9, the control lever 47 is supported by a frame F to be pivotable about an axis X to operate the clutch C. The control lever 47 is also pivotable about an axis Y extending perpendicular to the axis X, and biased by a coil spring 49 in a predetermined pivoting direction. The coil spring 49 extends obliquely between an intermediate position of the control lever 47 and an engaging member 50 disposed under the axis X, to act also as a toggle spring on the control lever 47. As shown in FIG. 10, the frame F defines a guide opening 51 for guiding the control lever 47. The guide opening 51 includes a clutch engaging position ON and a declutching position OFF in the form of engaging recesses 53 and 52, respectively, into which the control lever 47 is movable under the biasing force of the coil spring 49. The guide opening 51 further includes a stepped portion 54 opposed to the engaging recess 52 defining the declutching position OFF. The stepped portion 54 engages the control lever 47 in the course of its movement to the clutch engaging position ON to positively produce the half-clutch condition. Consequently, a sudden clutch engagement is avoided reliably.

Figure 11:
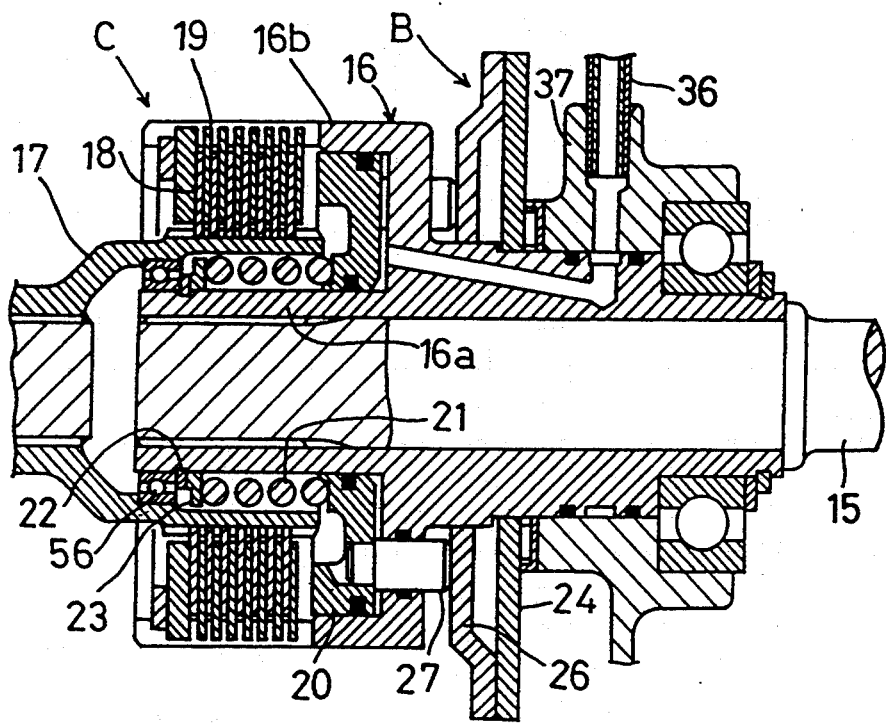
FIG. 11 is a sectional side view of a modified hydraulic clutch.
Figure 12:
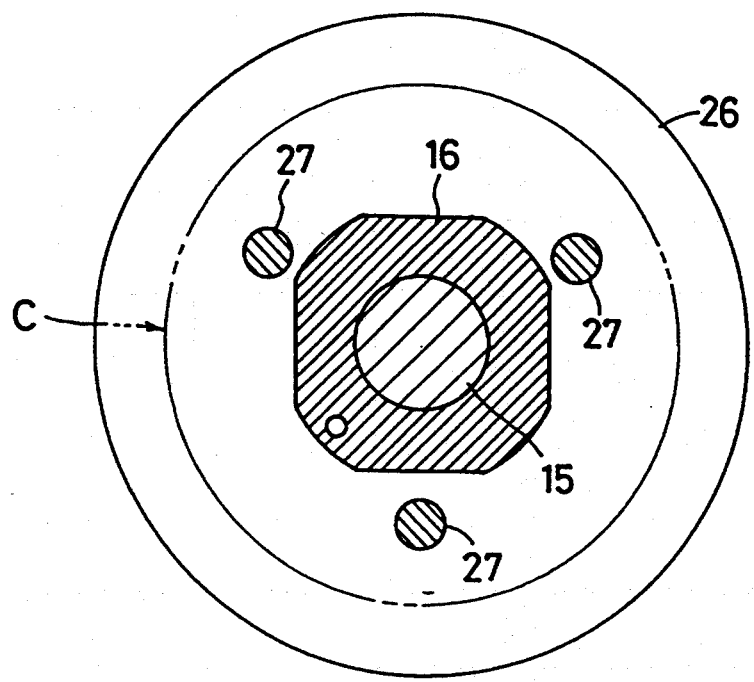
FIG. 12 is a front view of a second braking member shown in FIG. 11.

In the foregoing embodiment, the first braking member 26 is bolted to the pins 27 press fit in the hydraulic piston 20. Alternatively, as shown in FIGS. 11 and 12, the first braking member 26 may be mounted on a noncircular portion of the second sleeve 16 to be rotatable therewith and axially displaceable relative thereto. This braking member 26 may be pushed by pins 27 against the second braking member 24.

What is claimed is:

1. A friction clutch mounted in a transmission case and connected between a drive shaft for receiving engine power and a driven shaft for receiving power from the drive shaft and transmitting the power to a power takeoff shaft, said friction clutch comprising:
   a first sleeve connected to said drive shaft;
   a second sleeve connected to said driven shaft;
   friction disk means disposed between said first sleeve and said second sleeve, said friction disk means being switchable between a clutch engaging state to enable power transmission between said first sleeve and said second sleeve, and a clutch disengaging state to disable the power transmission;
   a clutch piston movable between a first position to place said friction disk means in said clutch engaging state, and a second position to place said friction disk means in said clutch disengaging state; and
   a brake mechanism for braking rotation of said driven shaft when said friction disk means is in said clutch disengaging state, said brake mechanism including:
      a first braking member operatively connected to said clutch piston; and
      a second braking member for contacting said first braking member when said clutch piston is moved to said second position, said second braking member being rotatable through a predetermined range with said first braking member.

2. A friction clutch as defined in claim 1, wherein said second braking member is in the form of an annular plate relatively rotatably mounted on said second sleeve.

3. A friction clutch as defined in claim 2, wherein said second braking member includes a projection for engaging part of said transmission case when said second braking member is rotated, to rotate said second braking member about said second sleeve within 360 degrees.

4. A friction clutch as defined in claim 2, wherein said first braking member is in the form of an annular plate movable into face-to-face contact with said second braking member.

5. A friction clutch as defined in claim 4, wherein said clutch piston and said first braking member are interconnected by a plurality of connecting pins arranged circumferentially of said first braking member.

6. A friction clutch as defined in claim 1, wherein said friction clutch is hydraulically operable, and further comprises biasing means for biasing said clutch piston to said second position, said clutch piston being hydraulically movable from said second position to said first position against a biasing force of said biasing means.

7. A friction clutch as defined in claim 6, wherein said biasing means is a coil spring.

* * * * *